United States Patent Office 3,334,905
Patented Aug. 8, 1967

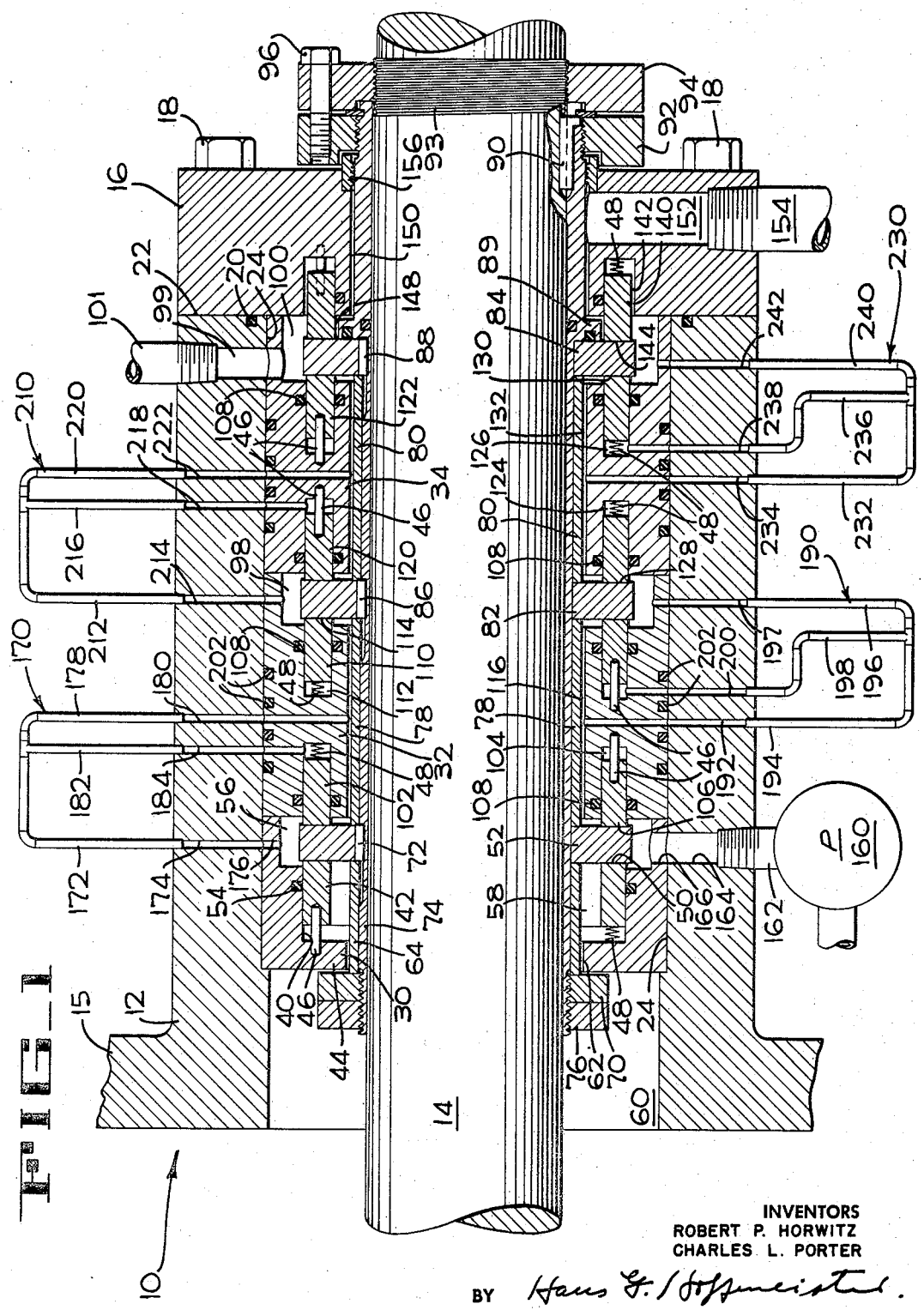

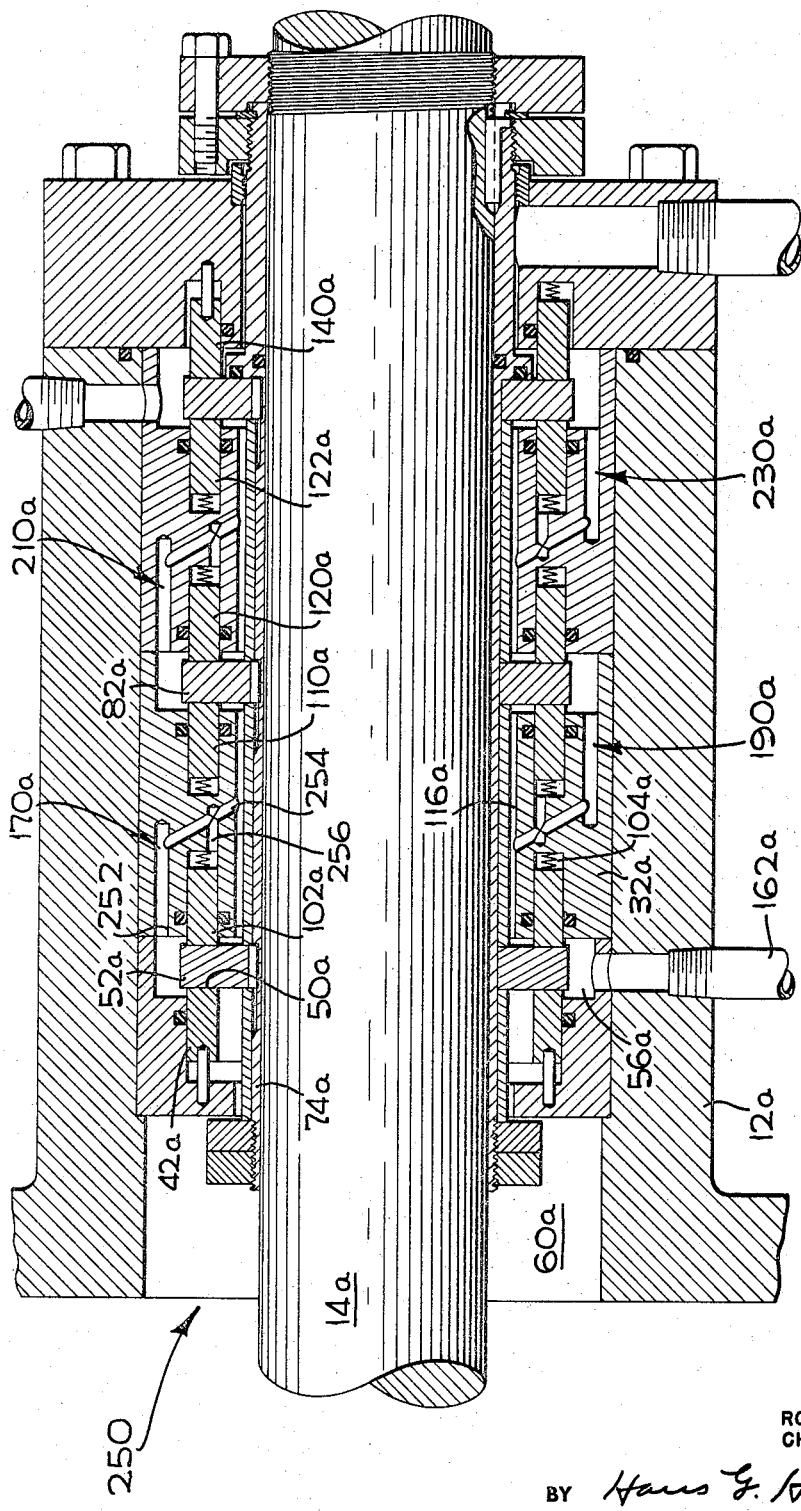

3,334,905
MULTIPLE STAGE PUMP SEAL
Robert P. Horwitz, La Crescenta, and Charles L. Porter, Alhambra, Calif., assignors to FMC Corporation, San Jose, Calif., a corporation of Delaware
Filed June 25, 1964, Ser. No. 378,008
19 Claims. (Cl. 277—3)

The present invention pertains to pump shaft seals, and more particularly relates to mechanical seals for high pressure and high temperature service.

One of the problems concerning the pumping of fluid at high temperatures and/or high pressures is to provide sealing means which are capable of long service under such conditions and which will operate without hazard to adjacent personnel or apparatus. Heretofore, both conditions were difficult to satisfy in sealing apparatus for handling high pressure, high temperature fluid because thermal and mechanical distortation of the sealing interfaces introduced distortion which impaired the sealing action.

The shaft seal of the present invention includes mechanically and fluid energized multiple sealing stages and a unique arrangement of servo passages which automatically increase the fluid energizing pressure of any seal which becomes imperfect. Further, if the sealing action of one sealing stage is impaired, the pressure differentials across the sealing interfaces of the successive downstream sealing stages are automatically adjusted to equally divide the total pressure. Another feature of the invention is the provision in each sealing stage of a fluid energized, non-metallic sealing ring which is capable of continuous axial flexure and is in fluid-sealing engagement with a rigid metal ring. Flexure of the energized ring accommodates any distortion along the sealing interface without impairing the fluid seal.

One of the objects of the present invention is to provide an improved seal for the driveshaft of a pump for high temperature, high pressure service.

Another object of this invention is to provide a face seal assembly having a fluid energized sealing ring and wherein the partial failure of the sealing action automatically increases the energization pressure of the energized sealing ring to compensate for its degree of failure.

Another object is to provide a pump shaft face seal wherein thermal or mechanical distortion of the normally planar sealing interface is continuously accommodated by flexure of one of the sealing rings.

Another object of the invention is to provide a multiple stage face seal assembly wherein leakage of one sealing stage automatically increases the energization pressure of the next downstream sealing stage.

Other objects and advantages of the present invention will become apparent from the following description and the accompanying drawings, in which:

FIGURE 1 is a longitudinal section through the improved pump shaft sealing assembly of the present invention; piping which is a part of the sealing assembly is schematically illustrated.

FIGURE 2 is a longitudinal section through a second embodiment of the invention which is so constructed as to be completely self-contained.

The pump shaft sealing assembly 10 (FIG. 1) of the present invention includes a hollow cylindrical housing 12 that may be part of, or secured to, a pump casing. The housing encloses part of a pump driveshaft 14 that extends coaxially therethrough. The pump end of the housing 12 is provided with a peripheral radial flange 15 which is sealed in fluid tight engagement to the fluid discharge casing, not shown, of a positive pressure pump that may handle fluids at relatively high pressures and temperatures.

The outer end of the housing 12 is provided with a closure ring flange 16 that is removably held in place by bolts 18 which extend through the ring and are threaded into the wall of the housing. A conventional O-ring 20 is mounted in a grooved portion of the end wall 22 of the housing 12 and provides a fluid tight seal under the closure ring 16.

The housing 12 is provided with a substantially coextensive machined counterbore 24, and in axially aligned and abutting relation within the counterbore are three mounting rings: a ring 30 adjacent the pump attachment flange 15, a central ring 32, and an end ring 34 which abuts the closure flange 16. The combined axial lengths of the mounting rings 30, 32 and 34 are such that they are tightly clamped within the counterbore 24 by the closure flange 16.

In general terms, the function of each ring 30, 32 and 34 is to provide means for mounting one or more non-rotatable face sealing rings, as 42, 102, 110, 120, 122 and 140, to define passage means for circulating injection fluid to energize the face sealing rings, and to define annular chambers, as 56, 98 and 100, adjacent the sealing surfaces within the housing 12.

Thus, the mounting ring 30 is provided with a cylindrical bore 40 in which the axially movable cylindrical face sealing ring 42 is mounted. An inwardly projecting radial flange 44 of the ring 30 is provided with one or more recesses each having a locking pin 46 (only one being shown) that extends into a corresponding recess of the sealing ring to prevent rotation of the sealing ring. A plurality of springs 48, only one being shown, are interposed between the radial flange 44 and the sealing ring 42. The springs urge the sealing ring into face sealing engagement, along a sealing interface 50, with a rotatable sealing ring 52 that is carried by the driveshaft 14. It will be apparent that the seal energizing springs 48 are used in a conventional manner and can be seated within sockets in either or both adjacent flange and wall surfaces.

The peripheral surface of the sealing ring 42 and the bore 40 is sealed by an O-ring 54 whereby an outer chamber 56, which is formed between the rotatable sealing ring 52 and an enlarged diameter portion of the mounting ring 30, is isolated from an inner chamber 58 which is defined in part by the inner wall surface of the sealing ring 42. Chamber 58 communicates with a chamber 60, that lies at the pump end of the housing 12, by means of an annular passage 62 which is formed between the inner axial wall of the radial flange 44 and a tubular spacer 64. The chamber 60 is open to the fluid discharge pressure of the pump to which the housing 12 is attached.

The spacer 64 is locked between a nut 70 and the rotatable sealing ring 52, the ring being held by a key 72 to an elongate sleeve 74 that is mounted for rotation with the driveshaft 14. Nut 70 is threaded onto the sleeve 74 and is in turn held by a locknut 76 which is also threaded onto the sleeve. In similar manner, adjacent tubular spaces 78 and 80 axially fix the positions of rotatable sealing rings 82 and 84 that lie between the nut 70 and a projecting flange 89 on the sleeve 74. Keys 86 and 88 are seated in keyways of the sleeve 74 and respectively engage the rings 82 and 84 so as to positively rotate the sealing rings with the sleeve. Rotation of the sleeve 74 with the driveshaft 14 is effected by a key 90 which is seated in aligned keyways of the driveshaft and sleeve near the closure ring flange 16.

The outer end portion of the sleeve 74 has exterior threads engaged by a threaded nut 92, and an adjacent threaded portion 93 of the driveshaft 14 has a nut 94 threaded thereon and locked to the nut 92 by a bolt 96. This construction thus allows some small degree of axial adjustment of the sleeve 74 on the driveshaft 14 by adjustment of the nuts 92 and 94 so that the rotatable sealing ring 52 can be centered in the outer chamber 56. Such centering also provides that the rotatable sealing rings 82 and 84 are properly positioned within their respective outer chambers, namely, a chamber 98 that lies between the mounting rings 32 and 34, and a chamber 100 that lies between the mounting ring 34 and the closure flange 16. The chamber 100 communicates with aligned passages in the housing and mounting ring 34, as generally indicated at 99, and with an associated outlet conduit 101, the purpose of which will later be mentioned.

The sealing ring 102 is axially movably mounted in an annular recess of the ring 32. The sealing ring 102 is spaced from the bottom of the recess, and the pressure chamber 104 thus formed is utilized to direct injection fluid under pressure against the downstream end wall of the sealing ring 102 to energize the ring into face sealing engagement, along a sealing interface 106, with the adjacent end wall of the rotatable ring 52. Conventional O-rings 108 bear against the inner and outer surfaces of the sealing ring 102 to prevent escape of fluid from the chamber 104. In addition to fluid energization, a plurality of the springs 48 mechanically energize the ring in the same way described in connection with the sealing ring 42, and one or more locking pins 46 prevent its rotation relative to the mounting ring 32.

By structural arrangement the same as above described for the mounting of the sealing ring 102, the sealing ring 110 is mounted at the downstream end of the mounting ring 32 and is cooperatively associated with an annular pressure chamber 112 in the ring 32 for directing injection fluid under pressure against ring 110 to energize the same into face sealing engagement with the rotatable ring 82 along a sealing interface 114. The inner wall of the mounting ring 32 is spaced radially outward from the spacer 78 to thereby form an annular inner passage 116 which establishes fluid communication between the downstream or low pressure side of interface 106 and the upstream or high pressure side of interface 114.

The mounting ring 34 is formed similar to the mounting ring 32 and mounts two axially movable, non-rotatable face sealing rings, namely the upstream ring 120 and the downstream ring 122. The rings are respectively mounted in pressure chambers 124 and 126 which are adapted to direct injection fluid under pressure against the rings to energize them into face-sealing engagement along sealing interfaces 128 and 130 with the rotatable rings 82 and 84. Further, the inner wall of the mounting ring 34 is spaced outward of the spacer 80 so as to form an inner annular passage 132 that establishes communication between the downstream side of the upstream side of the interface 130. A plurality of the springs 48 and pins 46, respectively, mechanically energize and prevent rotation of the sealing rings 120 and 122, and each sealing ring has O-rings 108 in cooperative association therewith for the same purpose and as previously described in connection with the sealing ring 102.

The sealing ring 140 is comparable to the sealing ring 42, is mounted in a recessed portion 142 of the closure ring 16, and effects a mechanically energized sliding face seal with the ring 84 along a sealing interface 144 by means of a plurality of the energizing springs 48. It is to be noted that the peripheral surface of the projecting radial flange 89 of the sleeve 74, against which flange the rotatable ring 84 is seated, lies radially inward of the inner surface of the sealing ring 140. This construction thus provides an annular passage 148 that establishes communication between the downstream side of the sealing interface 144 and an inner annular passage 150 that is formed by the confronting, radially spaced inner and outer walls of the closure flange 16 and the sleeve 74. Passage 150 opens into a radial bore 152 in the closure flange 16 and is provided with a drain outlet conduit 154 which leads to atmosphere. The outer end of the passage 150 is substantially closed by a conventional throttle bushing 156 which assures that any leakage fluid reaching the passage 150 will be discharged to atmosphere through the drain outlet conduit 154.

As thus far described, it will be seen that the chamber 60 carries pump fluid at high pressure which is isolated from atmosphere outside the closure flange 16 by the three rotatable sealing rings 52, 82, 84 and their respective energized rings 42 and 102, 110 and 120, 122 and 140. By the particular construction and arrangement of the three sealing stages formed by the sealing rings, six sealing interfaces 50, 106, 114, 128, 130 and 144 are thus provided in a primary flow path between the chamber 60 and the drain outlet 154.

As will be presently described, in the event of partial or total failure of the sealing action along the sealing interfaces 106, 114, 128 and 130 of the sealing rings, some part of the injection fluid will traverse secondary flow paths 170, 190, 210, and 230 which are so related to the sealing interfaces that any impaired sealing action is automatically adjusted and tends to resume its original effectiveness because the energizing pressure for the fluid-energized sealing ring or rings is automatically increased. At the same time, the pressures at each end of the sealing interfaces of the successive sealing stages are automatically adjusted. It will be apparent that any fluid transfer other than along the primary or secondary flow paths such as between the sleeve 74 and the shaft 14, or between the shaft and the sealing rings 52, 82 and 84, is minimal because the clearances are very small. However, if it is so desired, these possible leakage paths can be sealed by conventional O-rings.

The outer chamber 56 which circumscribes the sealing ring 52 is supplied with cool, circulating injection fluid at constant pressure such as water, from an auxiliary pump 160, or other source. The injection fluid is fed through an inlet conduit 162 and aligned passages 164 and 166 that lead into the chamber 56 through the housing 12 and mounting ring 30. The injection fluid is bled from the shaft sealing assembly 10, after traversing each sealing interface, by means of the conduit 101. After cooling, the discharged injection fluid may be recirculated through the assembly or a fresh supply of water may be continuously introduced into the chamber 56. The pressure of the injection fluid in the chamber 56 is higher, for example about 100 p.s.i., than the pressure of the pump fluid in chamber 60 so that any substantial leakage which might occur across the sealing interface 50 is toward the pump.

The previously mentioned secondary flow paths include, at the upper left portion of FIGURE 1, what may be conveniently termed an external capillary tubing stage 170 in that its general function is to reduce fluid pressure. The capillary tubing stage is formed of very small tubing having such internal diameter and length to produce a predetermined pressure drop of fluid therein between its inlet and outlet ends. It should be noted at this point that other means, such as restrictive orifices in a large diameter tubing, are the equivalent in function to the capillary tubing stage and can be employed to achieve the controlled pressure reductions for the purposes subsequently described. The capillary tubing stage 170 is provided with a tube or duct 172 which communicates at its inlet end with aligned passages 174 and 176 that are respectively formed in the housing 12 and in the mounting ring 30, the passage 176 leading into the outer chamber 56.

Subsequent references to specific pressure are given by way of example and for later reference to typical operating conditions; the scope of the invention is not dependent upon the exact pressures set forth.

A terminal tube 178 of the capillary tubing stage 170 communicates with aligned passages indicated at 180 which extend through the housing 12 and the mounting ring 32 and terminate in communication with the annular passage 116. The pressure of the injection fluid thus delivered to the passage 116 is at about 500 p.s.i.

less than the 2100 p.s.i. pressure of the fluid in the outer chamber 56, whereby the pressure differential across the sealing interface 106 is 500 p.s.i. An intermediate tube 182 of the capillary tubing stage 170 communicates with aligned passages at 184, in the housing 12 and ring 32, that deliver fluid at an intermediate pressure, in this case about 400 p.s.i. lower than the pressure in chamber 56, to the seal energizing chamber 104. The sealing ring 102 is thus energized into face sealing contact with the sealing ring 52 under a pressure of 1700 p.s.i. to effect a seal across the sealing interface 106 which is subject to a pressure differential of 500 p.s.i.

A capillary tubing stage 190 communicates, via aligned passages at 192, with the annular passage 116 and is adapted to transmit injection fluid to the next downstream sealing stage with appropriate reductions in pressure. Thus, an initial tube 194 of the capillary tubing stage 190 is supplied with fluid at 1600 p.s.i. and a terminal tube 196 reduces this pressure to about 1100 p.s.i. at its point of delivery, after traversing aligned passages at 197, into the outer chamber 98. An intermediate tube 198 of the capillary tubing stage 190, and aligned passages at 200, deliver injection fluid to the seal energizing chamber 112 at a pressure of 1200 p.s.i. Accordingly, the sealing ring 110 is hydraulically urged into face sealing engagement with the sealing ring 82 with a pressure of 1200 p.s.i. to effect a fluid seal across the interface 114 which is subjected to a differential pressure of 500 p.s.i., this being the pressure difference between chambers 116 and 98. It will be noted that O-rings 202 are mounted in corresponding grooves in the mounting ring 32 to maintain the isolation of the various passages associated with the capillary tubing stages 170 and 190 from one another.

A third capillary tubing stage 210 is provided to transfer fluid from the outer chamber 98 into the seal energizing chamber 124 at reduced pressure, and into the annular chamber 132 at a further reduced pressure. For these purposes an initial tube 212 of the capillary tubing stage 210 is connected to a passage indicated at 214 which conducts fluid from the outer chamber 98 at 1100 p.s.i. A tube 216 transfers part of this fluid, through aligned passages at 218, into the seal energizing chamber 124, at which point the pressure of the fluid is about 700 p.s.i. A terminal tube 220 and aligned passages at 222 conduct fluid into the annular chamber 132 wherein the fluid is at about 600 p.s.i. It will thus be seen that the sealing ring 120 is hydraulically energized by fluid at 700 p.s.i. to effect a seal across the sealing interface 128 which is subject to a pressure differential of 500 p.s.i., this being the pressure difference between the fluid in chambers 98 and 132.

The last downstream capillary tubing stage at 230 is comparable to the capillary tubing stage 190 and is provided with a tube 232, connected to aligned passages at 234, for conducting the fluid (at 600 p.s.i.) from the chamber 132. Part of this fluid is conducted through a tube 236 and aligned passages at 238 into the seal energizing chamber 126, at which point the pressure approximates 200 p.s.i. A third tube 240 of the tubing stage 230 communicates with passages at 242 and conducts fluid into the outer chamber 100 wherein the fluid is maintained at a pressure of about 100 p.s.i. by means of a restricting orifice, not shown, in the outlet conduit 101. The hydraulic energizing pressure of the sealing ring 122 is thus 200 p.s.i. and the pressure differential across the seal interface 130 of the sealing rings 122 and 84 is, as in the case of the three adjacent upstream sealing faces, 500 p.s.i. Because the annular passage 150 communicates with atmosphere, the pressure differential across the sealing interface 144 of the mechanically energized sealing ring 140 with the sealing ring 84 is only 100 p.s.i.

In a specific example of operating conditions, structural dimensions and materials which are advantageous with the particular differential and sealing pressures above set forth, the discharge pressure of the pump, not shown, to which the housing 12 is attached is 2000 p.s.i. and the radial dimension of each of the sealing interfaces 50, 106, 114, 128, 130 and 144, is approximately ⅜ of an inch. The sealing rings 52, 82 and 84 which rotate with the shaft 14 are formed of metal, preferably a relatively hard metal with a high modulus of elasticity such as tungsten carbide.

All of the energized sealing rings 42, 102, 110, 120, 122 and 140 are formed of a carbon and graphite composition which is commercially available from domestic manufacturers. One particular grade of carbon which has been found to be especially suitable is manufactured by the U.S. Graphite Company and is sold under the designation Graphitar 39SC. One characteristic of the carbon rings, besides having a very low coefficient of friction, is that they have a very low modulus of elasticity. Thus the rings, although they are fairly rigid, are capable of being distorted axially, to a marked degree, while retaining their circular configuration. Carbon sealing rings have sometimes been considered undesirable for high pressure, high temperature service where they might be thermally or mechanically distorted, but in accordance with the present invention, their low modulus of elasticity is used to advantage by hydraulically energizing the carbon rings 102, 110, 120 and 122 with fluid at pressure high enough to maintain them in close sealing engagement with the rigid metal sealing rings.

Accordingly, any small degree of thermal or mechanical distortion or warpage which may occur to either or both the rigid metal rings 52, 82 and 84 and the carbon rings, 102, 110, 120, and 122 does not appreciably affect the sealing action along the sealing interfaces 106, 114, 128, and 130 because the carbon rings continuously flex while operating and thus minimize the leakage paths across the sealing interfaces.

The cool injection fluid, for example water, is supplied by pump 160 at 2100 p.s.i. and at a flow rate of about two gallons per minute, whereby a continuous circulation of the injection fluid from its inlet conduit 162, along the sealing interfaces 106, 114, 128 and 130, and through capillary tubing stages 170, 190, 210 and 230 and associated passages to the outlet 101, maintains a cool circulating liquid film at the sealing interfaces so that the film cannot reach its vaporization temperature under normal operating conditions.

Meanwhile, the total pressure differential of 2100 p.s.i. between the chamber 56 and atmosphere is reduced 500 p.s.i. at each sealing interface 106, 114, 128 and 130; and 100 p.s.i. across the sealing interface 144. These sealing pressure differentials are quite low in comparison to the pressure differentials which the sealing rings are capable of handling without undue wear. Accordingly, the low pressure differentials assure a long life for all of the sealing rings under usual operating conditions.

When initially placed in operation, a small volume of the injection fluid in the chamber 56 leaks across the sealing interface 50, enters the chamber 60, and is entrained in the fluid discharge of the pump.

In the event that undue leakage develops across the sealing interface 106, i.e. leakage other than the normal circulating flow of the injection fluid, the hydraulic energization pressure against the sealing ring 102 is automatically increased to counteract such leakage. For example, a substantial leakage at the sealing interface 106 will cause some of the injection fluid in the outer chamber 56 to flow into the inner chamber 116. The pressure in chamber 116 thus rises above its initial 1600 p.s.i. due to the introduction of the fluid from chamber 56 at 2100 p.s.i. This increased pressure is transmitted through the passages at 180 and the tubes 178 and 182. As a result, the normal seal-energizing pressure of 1700 p.s.i. in the seal energizing chamber 104 is increased in proportion to whatever the pressure increase is in the chamber 116, thus to force the sealing ring 102 with additional pressure against the sealing ring 52 and tend to restore the original effectiveness of the sealing action.

Thus, a pressure loss from chamber 56 to chamber 116 of up to the maximum possible loss of 2100 p.s.i. will increase the hydraulic energizing pressure of the sealing ring 102. When the pressure in the inner chamber 116 rises to 2100 p.s.i., the capillary tubing stage 190 delivers fluid into the outer chamber 98 at a pressure of 1443 p.s.i. instead of the former pressure of 1100 p.s.i. At the same time, fluid is directed into the seal energizing chamber 112 at 1574 p.s.i. instead of the former pressure of 1200 p.s.i. It is therefore apparent that while the pressure differential across the sealing interface 114 increases, the seal energizing pressure also increases.

Correspondingly, the 343 p.s.i. pressure increase in the outer chamber 98, if the sealing interfaces 114 and 128 are not impaired, is transferred by the capillary tubing stages 210 and 230 to increase the pressure at each of the various downstream pressure locations previously mentioned. Thus, the capillary tubing stage 210, by means of the tube 216, causes the pressure in the seal energizing chamber 124 to rise to 917 p.s.i. instead of its former pressure of 700 p.s.i. The tube 220 effects a pressure rise in the inner chamber 132 to 786 p.s.i. instead of its former pressure of 600 p.s.i. The pressure differential across the sealing interface 128 is, therefore, now 657 p.s.i., and the hydraulic energizing pressure of the sealing ring 120 has increased by 217 p.s.i.

In similar manner, the capillary tubing stage 230 transfers fluid at 786 p.s.i. from the chamber 132 and causes an increase in the pressure in the seal energizing chamber 126 to 260 p.s.i. instead of its former 200 p.s.i. The pressure in the outer chamber 100 rises to 129 p.s.i., which pressure is only a 29 p.s.i. increase for the mechanically energized sealing ring 140.

If the central sealing stage comprising the sealing rings 86 and 110 should partially fail by total leakage across the sealing interface 114 while the first sealing stage interface 106 is unimpaired, the 1443 p.s.i. pressure in the inner chamber 116 is transferred to the outer chamber 98, which pressure rise represents an increase of 343 p.s.i. However, the pressure differential across the sealing interface 128 is adjusted to 657 p.s.i. because the capillary tubing stage 210 conveys fluid at 786 p.s.i. to the inner chamber 132. Although the pressure differential increases by 157 p.s.i. from when the sealing ring 110 was fully effective, the hydraulic energizing pressure for the sealing ring 120 increases by 217 p.s.i.

It is thus evident that the capillary tubing stages 170, 190, 210 and 230 with their respective fluid-energized sealing interfaces 106, 114, 128 and 130 are in a series hydraulic circuit, including parallel combinations of the interfaces and their respective tubing stages, between the injection fluid inlet conduit 162 and outlet conduit 101, whereby total failure of the sealing action across one interface, for example 106, will cause the total pump pressure of 2100 p.s.i. to be equally distributed among the remaining sealing interfaces 114, 128 and 130. Therefore, partial or total failure of any of the hydraulically energized sailing rings, except the last downstream ring 122, will automatically initiate and effect a pressure adjustment of the next downstream sealing interface. Further, if the downstream sealing interface 106 or 128 of the first or second sealing stages leak beyond the normal lubricating amount, pressure compensation is also effected for the leaking sealing ring in addition to the next downstream sealing interface.

Because any sealing interface leakage in excess of the normal circulation of the injection fluid (again with reference to only the hydraulically energized sealing rings) will cause a radical pressure change in the various associated tubes of the capillary tubing stages 170, 190, 210 and 230, it is possible to employ pressure sensing means, not shown, connected to the tubes visibly or audibly to determine the effectiveness of the sealing interfaces while the shaft sealing assembly 10 is operating. Thus, pressure gauges, or pressure switches which are preset to open and close associated electrical contacts within certain pressure limits, can be connected to the capillary tubing stages so that external indication of the condition of the sealing means is possible.

The second embodiment of the shaft sealing assembly of the present invention is illustrated in FIG. 2, closely parallels the construction of the assembly 10 and primarily concerns structure which eliminates the external capillary tubing stages. Accordingly, the same reference numerals are used, with the suffix "a," for those parts of the shaft sealing assembly 250 (FIG. 2) which correspond to the parts already described.

The pump driveshaft 14a carries a sleeve 74a which has carbon steel sealing rings 52a, 82a and 84a mounted thereon for rotation with the driveshaft and sleeve, and which respectively cooperate with pairs of carbon sealing rings 42a and 102a, 110a and 120a, 122a and 140a.

The outer chamber 56a adjacent the sealing rings of the first sealing stage communicates with an inlet conduit 162a which supplies cool injection fluid to the chamber at a pressure (for example 100 p.s.i.) higher than the pump pressure in the chamber 60a. This fluid circulates through a capillary passage stage 170a which comprises small diameter passages or ducts (exaggerated in size for clarity) and which lie totally within a mounting ring 32a. It will thus be evident that a passage 252 corresponds to the initial tube 172 (FIG. 1), a passage 254 corresponds to the terminal tube 178, and that a passage 256 corresponds to the intermediate tube 182.

Passages 252, 254 and 256, if the operating conditions set forth for the shaft sealing assembly 10 are the same for the shaft sealing assembly 250, function to achieve the same reductions in pressure mentioned in the first instance. For example, if the chamber 56a contains injection fluid at 2100 p.s.i., the passages 252 and 256 deliver fluid at 1700 p.s.i. into the seal energizing chamber 104a to hydraulically energize the sealing ring 102a. At the same time the passage 254 delivers fluid at 1600 p.s.i. into the inner chamber 116a, and any leakage due to an imperfect seal across the sealing interface 50a results in the same pressure changes described in conjunction with the shaft seal assembly 10 whereby the sealing action tends to be self-correcting. In similar manner, the shaft sealing assembly 250 is provided with capillary passage stages 190a, 210a and 230a which correspond in function to the capillary tubing stages 190, 210 and 230, and which correspond in construction to the capillary passage stage 170a.

The particular utility of the shaft sealing assembly 250 is where external capillary tubing stages might be subject to damage, or where no pressure sensing means are required to be connected to the stages to determine the operating efficiency of the sealing rings. However, it will be apparent that the assembly 250 can be provided with sealed passages that lead through the housing 12a and terminate at interior pressure points of the capillary passages and at exterior gauges or indicators. On the other hand, the external capillary tubing stages are readily accessible for cleaning or repair without dismantling the sealing assembly 10. As used in the appended claims, wall means is intended to include both the internal and external pressure reducing stages of FIGURES 1 and 2.

In both embodiments of the invention the unique sealing pressure compensating features and differential pressure adjustments are automatically effected without the necessity of auxiliary pressure regulators, valves, controls and so forth, and the sealing effectiveness of each sealing stage is maintained at optimum value over a long period of operation. Further, because of the improved operational results achieved by the shaft sealing assembly of this invention, the assembly is particularly useful in high pressure, high temperature service where the pump fluid requires extraordinary precautions to prevent its escape.

While particular embodiments of the present invention have been shown and described it will be understood that the particular details herein set forth are capable of modification and variation without departing from the principles of the invention and that the scope of the invention should be limited only by the scope and proper interpretation of the claims appended hereto.

The invention having thus been described, that which is believed to be new and for which protection by Letters Patent is desired, is:

1. In a shaft seal assembly, the combination of means defining two spaced chambers, first and second sealing rings arranged for relative rotation and defining therebetween a radially extending fluid sealing interface extending between said chambers, means for fluid energizing said second sealing ring into face sealing engagement with said first ring to effect a fluid-tight seal across the sealing interface, pressure reduction means interconnecting said chambers for regulating the differential pressure across said sealing interface, and means interconnecting said energizing means and said pressure reduction means for fluid intercommunication so that the energizing pressure increases when the differential pressure across said interface decreases.

2. The assembly of claim 1 wherein one of said sealing rings is of carbon-graphite, wherein one of said rings has an annular energizing surface, and wherein fluid pressure is substantially uniformly applied over a continuous circumferential area of said energizing surface.

3. In a shaft sealing assembly a housing; a rotatable shaft extending through said housing; interengaging hydraulically energized sealing means interposed between the shaft and the housing for preventing fluid leakage axially along the shaft and across a sealing interface of the sealing means; pressure control means including means defining first, second and third intercommunicating passages, said first passage communicating with one end of the sealing interface for directing fluid at a given pressure thereagainst, said second passage communicating with the other end of said interface for supplying fluid at a different pressure against said other end of said sealing interface, and said third passage communicating with said sealing means for supplying fluid at yet a different pressure to hydraulically energize said sealing means whereby the energizing pressure of said sealing means is proportionate to the differential pressure across said sealing interface.

4. A shaft seal assembly comprising a housing, a driveshaft extending through said housing, a pair of relatively rotatable sealing rings encircling the driveshaft within the housing and cooperatively defining a fluid-sealing interface, one of said rings being mounted on said driveshaft for rotation therewith and the other of said rings being axially movable into face sealing engagement with the rotatable sealing ring, means defining two separate annular chambers within the housing and individually communicating with an end of said sealing interface, means for supplying fluid under pressure into one of said chambers and pressure reduction means connected to said one chamber and communicating with the other of said chambers for supplying fluid at a lower pressure thereto, said latter chamber having fluid conducting means independent of said two chambers communicating with said axially movable sealing ring for supplying fluid at an intermediate pressure to hydraulically energize siad axially movable sealing ring into face sealing engagement with said rotatable sealing ring.

5. A shaft seal assembly comprising a stationary housing, a rotatable driveshaft extending through said housing, two relatively rotatable sealing rings encircling the driveshaft within the housing and cooperatively defining a radially extending fluid-sealing interface, one of said rings being secured to said driveshaft for rotation therewith and the other of said rings being axially movable into face sealing engagement with the rotatable sealing ring, means including an annular chamber for supplying fluid at a given pressure against the radially outer limits of said sealing interface, and a capillary tubing stage connected to said chamber for supplying fluid at a lower pressure against the radially inner limits of said sealing interface and for supplying fluid at an intermediate pressure to hydraulically energize said axially movable sealing ring into face sealing engagement with said rotatable sealing ring.

6. A shaft seal comprising a hollow housing; a rotatable shaft extending through said housing; an axially movable and non-rotatable sealing ring mounted within said housing; a rotatable sealing ring secured to said shaft and having an end surface in sliding sealing engagement with said non-rotatable sealing ring, the interengaging areas of said sealing rings defining a sealing interface; means defining intercommunicating passages through said housing, one of said passages being in communication with one end of said interface, a second one of said passages being in communication with the other end of said interface, and a third one of said passages being in communication with the free end of said rotatable sealing ring; and means for supplying fluid at a given pressure into said first passage whereby an imperfect seal at the interface communicates part of the fluid from said first passage through said second passage and into said third passage, whereby the fluid pressures in the second and third passages are related to the effectiveness of the fluid sealing action of the sealing interface.

7. In a sealing assembly, a pump driveshaft; a rigid sealing ring secured to said driveshaft for rotation therewith, one end of said ring having a radial sealing face; a first sealing ring having a radial end surface in sliding sealing engagement with said radial sealing face of said rigid ring; interengaging areas of said first and rigid sealing rings forming a sealing interface located between the fluid discharge of the pump and atmosphere; mounting rings interposed between said shaft and said housing and defining a first annular chamber circumscribing said sealing rings at the radially outer ends of said sealing interface, a second annular chamber communicating with the radially inner end of said sealing interface, and a third annular chamber defined in part by the free end surface of said first sealing ring; means for supplying fluid under pressure to said first annular chamber; and intercommunicating passage means communicating with said first and third chambers for bleeding fluid from said first chamber and supplying said fluid at reduced pressure to said third chamber to energize said first sealing ring, and communicating with said second annular chamber, whereby leakage of fluid across said sealing interface from said first to said second chambers returns to said third chamber in order to automatically increase the energizing pressure for said first sealing ring and simultaneously reduce the pressure differential across said sealing interface between said first and second annular chambers.

8. In a shaft seal assembly, the combination of a first sealing stage having relatively rotatable first and second sealing rings defining a first fluid sealing interface therebetween, first pressure control means connected to said first sealing stage for energizing one of said rings into face sealing engagement with the other end for regulating the differential pressure across the sealing interface, a second sealing stage having relatively rotatable first and second sealing rings defining a second fluid sealing interface therebetween, second pressure control means connected to said second sealing stage for energizing one of said second stage sealing rings into face sealing engagement with its associated sealing ring and for regulating the differential pressure across said second sealing interface, said first and second pressure control means each being arranged to regulate the pressure differential across its associated sealing interface in such manner that the corresponding sealing ring energizing pressure increases when the differential pressure decreases, each of said pressure control means having respective fluid inlet and outlet ends between which the fluid pressure decreases in the direction of flow, and means defining a fluid flow passage intercommunicating the outlet end of said first pressure control means with the inlet end of said second pressure control means so that the energizing and differential pressures in the second sealing stage are a function of the differential and sealing pressures of the first sealing stage.

9. A shaft sealing assembly comprising a housing, a rotatable shaft extending through said housing, a rigid sealing ring mounted on said shaft, a mounting ring axially spaced from said rigid sealing ring in substantially fluid sealed relation with the interior surface of said housing and having an inner wall spaced radially outward from said shaft to provide therebetween an inner annular chamber, a distortable sealing ring arranged for face-sealing engagement with one end wall of said rigid ring along a substantially radial sealing interface, the inner end of said sealing interface communicating with said inner chamber, said mounting ring being provided with an annular groove in which said distortable sealing ring is mounted, said groove being deeper than the axial length of said distortable ring to thereby form a pressure chamber adapted to contain fluid under pressure for energizing said distortable ring into face-sealing engagement with said rigid ring in the area of said sealing interface, means including said mounting ring defining an outer annular chamber circumscribing said sealing interface areas of said rigid and said distortable sealing rings, means for supplying fluid under pressure into said outer chamber, and a capillary tubing stage having an inlet tube communicating with said outer chamber and two outlet tubes respectively communicating with said pressure chamber and said inner chamber, all of said tubes being in intercommunication.

10. A sealing assembly for the driveshaft of a positive pressure pump comprising a hollow housing adapted to be secured to the pump in surrounding relation to the driveshaft; a rigid sealing ring secured to said driveshaft for rotation therewith and having opposite planar radial sealing faces; a first sealing ring having a radial end surface in sliding sealing engagement with one of said sealing faces of said rigid ring; a second sealing ring having a radial upstream end surface in sliding sealing engagement with the other sealing face of said rigid ring and an opposite downstream end surface; the interengaging areas of said first and second sealing rings with said rigid ring respectively forming sealing interfaces located upstream and downstream in relation to the fluid discharge of the pump; mounting rings interposed between said shaft and said housing defining a first annular chamber communicating the discharge fluid of the pump with the radially inner end of said upstream sealing interface, a second annular chamber circumscribing said rigid first and second sealing rings at the radially outer ends of said upstream and downstream sealing interfaces, a third annular chamber communicating with the radially inner end of said downstream sealing interface, and a fourth annular chamber axially slidably receiving said second sealing ring; means supplying fluid under pressure to said second annular chamber; and intercommunicating passage means bleeding fluid from said second annular chamber and supplying said fluid at lower pressures to said fourth annular chamber against said downstream end surface to energize said second sealing ring, and to said third annular chamber, whereby pressure transfer across said downstream sealing interface from said second chamber to said third chamber is directed into said fourth chamber in order to automatically increase the energizing pressure for said second sealing ring.

11. The sealing assembly of claim 10 wherein said first and second sealing rings are axially deformable.

12. The sealing assembly of claim 10 wherein said first and second sealing rings are formed of carbon-graphite.

13. In a fluid sealing system including a shaft, wall means rotatably receiving the shaft and, together with the shaft, defining a fluid passage, said wall means providing an energizing chamber opening into the passage, a first sealing ring surrounding and being connected to the shaft for rotation therewith, a second sealing ring surrounding the shaft and being mounted in said chamber for movement toward and away from said first ring into and out of engagement with said first ring thereby to provide a sealing interface with said first ring, said interface being in said passage and separating the passage into high and low pressure portions on opposite sides of the interface, said wall means including a main pressure reducing duct interconnecting the high and low pressure portions of said passage whereby the pressure in said low pressure portion is at a predetermined amount less than the pressure in said high pressure portion, said wall means also including an auxiliary pressure reducing duct connected between the energizing chamber and the main duct at a point between said high and low pressure portions, and means for introducing fluid under a predetermined pressure into said high pressure portion of the passage.

14. The system of claim 13 wherein said wall means includes a housing and wherein said ducts are partially interiorly and partially exteriorly of said housing.

15. The system of claim 13 wherein said wall means includes a housing and wherein said ducts are entirely within said housing.

16. In a fluid sealing system including a shaft, wall means rotatably receiving the shaft and, together with the shaft, defining a pair of axially spaced, radially extending main chambers and a passage interconnecting said chambers, said wall means also including a pair of annular, axially extending energizing chambers individually opening into said main chambers, each of said chambers circumscribing said shaft, main sealing rings circumscribing and secured to said shaft for rotating therewith and individually projecting into said main chambers, secondary sealing rings axially slidably fitted in said energizing chambers individually confronting their adjacent main sealing ring and defining sealing interfaces therewith, and means for introducing fluid under a predetermined pressure into one of said main chambers, said wall means including pressure reducing ducts individually extending from said one main chamber to said passage and from said passage to said other main chamber whereby the pressure in said passage is less than said predetermined pressure and the pressure in the other main chamber is less than the pressure in said passage and whereby the pressure differentials across said interfaces are maintained at predetermined amounts.

17. The system of claim 16 wherein said wall means includes means for introducing fluid pressure from said ducts into said energizing chambers for urging said secondary rings against said main rings.

18. In a fluid sealing system including a shaft; wall means rotatably receiving the shaft and providing a series of annular chambers circumscribing and axially spaced along the shaft, said chambers including first and second chambers and a pair of confronting intermediate chambers between said first and second chambers, said wall means also providing a passage extending lengthwise of the shaft past said chambers and terminating in opposite inlet and outlet ends; first sealing rings circumscribing and secured to said shaft and radially projecting into said passage with one of said rings confronting said first chamber, another of said rings confronting said second chamber, and still another of said rings confronting both of said intermediate chambers; second sealing rings individually fitted in said chambers and confronting their respectively adjacent first sealing rings thereby defining first and second sealing interfaces and a pair of intermediate sealing interfaces, each of said interfaces dividing said passage into upstream and downstream portions on opposite sides of each interface whereby the downstream side of one interface is connected by the passage to the upstream side of the next successive interface along the passage and means for introducing fluid under pressure into the inlet end of the passage, said wall means including pressure reducing ducts individually interconnecting the upstream and downstream portions of the passage on opposite sides of each interface.

19. The system of claim 18 wherein said wall means includes auxiliary ducts individually interconnecting the chambers and the pressure reducing ducts associated with the interfaces established by the rings in said chambers.

References Cited

UNITED STATES PATENTS

| | | | |
|---|---|---|---|
| 2,175,868 | 10/1939 | Bentley | 277—138 X |
| 2,836,440 | 5/1958 | Brumagim | 277.—62 |
| 2,921,805 | 1/1960 | Schevchenko | 277—62 |
| 3,068,012 | 12/1962 | Van Fleet | 277—27 |
| 3,119,623 | 1/1964 | Shevchenko | 277—3 |
| 3,144,253 | 8/1964 | Schirmer | 277—27 |
| 3,179,422 | 4/1965 | Phillips | 277—3 |

SAMUEL ROTHBERG, *Primary Examiner.*